(12) United States Patent
Gil

(10) Patent No.: US 8,204,250 B2
(45) Date of Patent: Jun. 19, 2012

(54) AUDIO PROCESSING SYSTEM AND METHOD

(75) Inventor: Myeong-Ho Gil, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1286 days.

(21) Appl. No.: 11/407,087

(22) Filed: Apr. 20, 2006

(65) Prior Publication Data

US 2007/0030400 A1  Feb. 8, 2007

(30) Foreign Application Priority Data

Aug. 8, 2005  (KR) .................. 10-2005-0072489

(51) Int. Cl.
*H04B 15/00* (2006.01)
*H03F 99/00* (2009.01)
*H02B 1/00* (2006.01)

(52) U.S. Cl. .................. 381/94.5; 381/120; 381/123

(58) Field of Classification Search .................. 381/28, 381/81, 84, 94.5, 120, 123, 104–107, 94.1
See application file for complete search history.

(56) References Cited

U.S. PATENT DOCUMENTS

| 4,965,835 | A | * | 10/1990 | Hochstein | ...................... | 381/110 |
| 5,910,991 | A | * | 6/1999 | Farrar | .............................. | 381/59 |
| 6,157,726 | A | * | 12/2000 | Carroll et al. | ................ | 381/94.5 |
| 7,130,433 | B1 | * | 10/2006 | Suzuki | ......................... | 381/94.8 |

\* cited by examiner

*Primary Examiner* — Devona Faulk
*Assistant Examiner* — George Monikang
(74) *Attorney, Agent, or Firm* — H.C. Park & Associates, PLC

(57) ABSTRACT

In an audio processing system and method, pull-up circuits and a capacitor circuit are used to cause gradual change in voltage levels of audio signals which would otherwise change abruptly due to high-speed switching when switching from a first audio signal to a second audio signal at a user's command. As a result, pop noise is prevented.

17 Claims, 3 Drawing Sheets

AUDIO PROCESSING SYSTEM AND METHOD

CLAIM OF PRIORITY

This application makes reference to, incorporates the same herein, and claims all benefits accruing under 35 U.S.C. §119 from an application for APPARATUS AND METHOD FOR PROTECTING NOISE IN AUDIO PROCESSING SYSTEM filed in the Korean Intellectual Property Office on Aug. 08, 2005 and there duly assigned Serial No. 2005-72489.

BACKGROUND OF THE INVENTION

1. Field of the Invention

The present invention relates to an audio processing system and method capable of preventing noise.

2. Related Art

Currently, a hybrid set-top box which receives at least two broadcast signals, such as a satellite signal, a terrestrial signal, and so forth, and which outputs one broadcast signal to a television (TV) or a personal computer (PC) at a user's command, is under development. The hybrid set-top box is an example of a large class of mainstream consumer electronic devices employing an audio processing system which selects one of a plurality of input audio signals and outputs the audio signal through an audio output device, e.g., a speaker.

An audio processing system comprises a plurality of input units, a selector, and an amplifier.

The input units are connected to audio equipment, e.g., a digital versatile disc (DVD) player, a stereo system, etc., and they output audio signals received from the audio equipment to the selector.

According to a selection signal input from a remote controller or a selection button manipulated by a user, the selector selects one of the audio signals inputted through the input units, and outputs it to the amplifier.

The amplifier amplifies the voltage level of the audio signal received from the selector by a predetermined ratio, and outputs it to a digital terminal, such as a TV or PC.

However, when the selector selects a second audio signal received from a second input unit at the user's command while the amplifier outputs a first audio signal received from a first input unit, pop noise is generated due to a difference in voltage level between the first and second audio signals.

In general, the audio processing system is designed in such a manner that the voltage level difference between audio signals inputted to the input units should range from 0 V to a value between about 0.2 V and 0.5 V.

Even if the voltage level difference between audio signals received from the input units is not large, it is amplified while passing through the amplifier, and thus pop noise is generated.

A different type of audio processing system also comprises a plurality of input units, a selector, and a plurality of amplifiers.

The amplifiers amplify each audio signal inputted through the input units by a predetermined ratio, and then the selector selects one of the audio signals at a user's command and outputs it to a digital terminal.

However, the amplifiers corresponding to the input units of the audio processing system are quite costly.

In addition, when the selector switches from an amplified first audio signal to an amplified second audio signal at the user's command, pop noise is generated due to a voltage level difference between the amplified audio signals.

Meanwhile, a one-to-one connection method has been used in order to prevent pop noise in an audio processing system. The one-to-one connection method involves removal of the selector which serves as a switch operating at a user's command, separate amplification of each audio signal input through at least one input by the amplifiers, and output of each amplified audio signal to a digital terminal.

However, the one-to-one connection method is quite costly since the audio signals separately amplified by each amplifier, must be sent to a digital terminal through separate lines. Also, the one-to-one connection method requires that the user manually connect the digital terminals to the amplifiers.

SUMMARY OF THE INVENTION

It is an object of the present invention to provide an audio processing system and method capable of preventing noise due to a voltage level difference between a first audio signal and a second audio signal when switching from the first audio signal to the second audio signal at a user's command, the audio signals being provided from separate audio equipment such as a DVD player, stereo system, and so forth.

According to an aspect of the present invention, an audio processing system comprises: a selector which maintains the voltage level of a selected one of at least two audio signals at a predetermined value, gradually increases the voltage level of the audio signal, and outputs the audio signal; and an amplifier which maintains the voltage level of the audio signal received from the selector at a predetermined value, and amplifies the audio signal by a predetermined ratio.

The selector preferably includes: a sub-selector which selects the audio signal at a user's command; a first voltage sustainer disposed at the input side of the sub-selector and made up of a plurality of resistors connected at one end to a first voltage source and at the other end to respective input lines of the sub-selector; and a noise prevention module disposed at the input side of the sub-selector and made up of a plurality of capacitors for receiving the audio signals at one end and connected to the input lines of the sub-selector at the other end.

The amplifier preferably includes: a sub-amplifier which amplifies the selected audio signal by the predetermined ratio; and a second voltage sustainer disposed at the input side of the sub-amplifier and made up of a plurality of resistors connected to a second voltage source at one end and connected to respective output lines of the sub-selector at the other end.

According to another aspect of the present invention, an audio processing system comprises: at least two input units, each receiving an audio signal; a selector which selects one of the audio signals at a user's command; an amplifier which amplifies the audio signal selected by the selector by a predetermined ratio; and a noise prevention module made up of a plurality of capacitors connected to the input port of the selector at one end and to respective output ports of the input units at the other end; wherein the noise prevention module is disposed between the input units and selector, and gradually increases the voltage levels of the audio signals for a predetermined time.

According to still another aspect of the present invention, an audio signal processing method comprises the steps of: maintaining the voltage level of at least two input audio signals at a predetermined value; gradually increasing the voltage level of a selected one of the audio signals at a user's command; maintaining the voltage level of the selected audio signal at a predetermined value; and amplifying the selected audio signal by a predetermined ratio.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
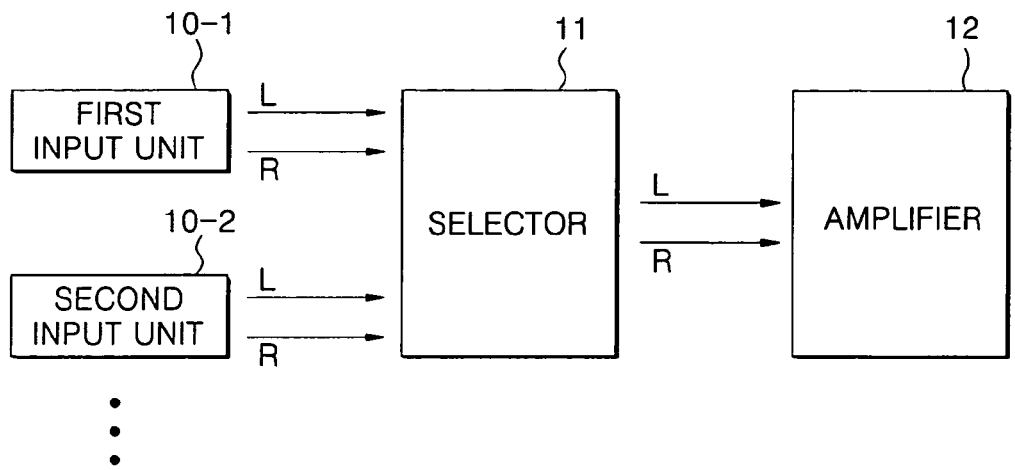
FIG. 1 is a schematic block diagram of an audio processing system.

Hereinafter, exemplary embodiments of the present invention will be described in detail with reference to the accompanying drawings. Like elements are denoted by like reference numerals throughout the drawings. Matters related to the present invention and well-known in the art will not be described in detail when such description would detract from the clarity and concision of the disclosure.

FIG. 1 is a schematic block diagram of an audio processing system.

Referring to FIG. 1, the audio processing system comprises a plurality of input units 10-1, 10-2, . . . , a selector 11, and an amplifier 12.

The input units 10-1, 10-2, . . . are connected to audio equipment (not shown), e.g., a digital versatile disc (DVD) player, a stereo system, etc., and output audio signals received from the audio equipment to the selector 11.

According to a selection signal input from a remote controller (not shown) or a selection button manipulated by a user, the selector 11 selects one of the audio signals inputted through the input units 10-1, 10-2, . . . , and outputs it to the amplifier 12.

The amplifier 12 amplifies the voltage level of the audio signal received from the selector 11 by a predetermined ratio, and outputs it to a digital terminal (not shown), such as a TV or PC.

However, when the selector 11 selects a second audio signal received from a second input unit 10-2 at the user's command while the amplifier 12 outputs a first audio signal received from a first input unit 10-1, pop noise is generated due to a difference in voltage level between the first and second audio signals.

In general, the audio processing system is designed in such manner that the voltage level difference between audio signals inputted to the input units 10-1, 10-2 . . . ranges from 0 V to a value between about 0.2 V and 0.5 V.

Even if the voltage level difference between audio signals received from the input units 10-1, 10-2, . . . is not large, it is amplified while passing through the amplifier 12, and thus pop noise is generated.

Figure 2:
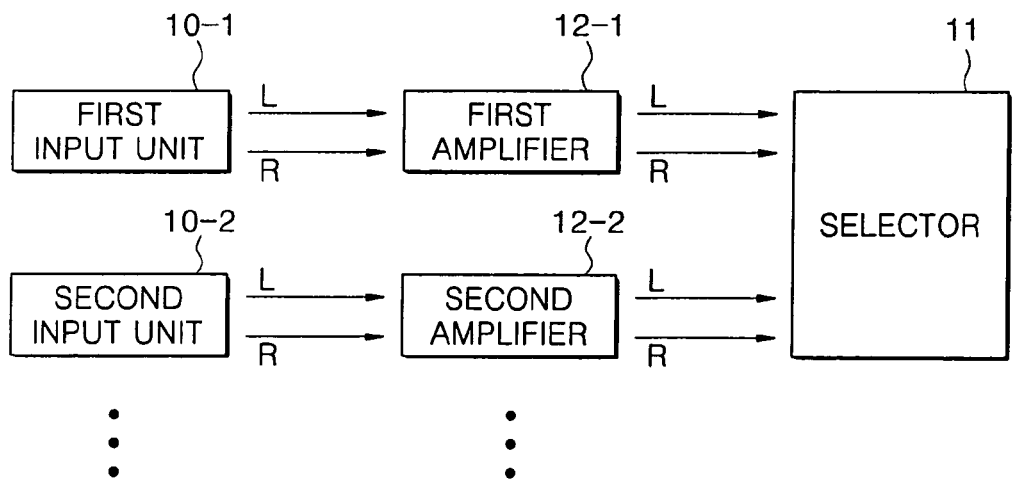
FIG. 2 is a schematic block diagram of another audio processing system.

FIG. 2 is a schematic block diagram of another audio processing system.

Referring to FIG. 2, the audio processing system comprises a plurality of input units 10-1, 10-2, . . . a selector 11, and a plurality of amplifiers 12-1, 12-2, . . . .

The amplifiers 12-1, 12-2, . . . amplify each audio signal inputted through the input units 10-1, 10-2, . . . by a predetermined ratio, and then the selector 11 selects one of the audio signals at a user's command and outputs it to a digital terminal (not shown).

However, the amplifiers 12-1, 12-2, . . . corresponding to the input units 10-1, 10-2, . . . of the audio processing system are quite costly.

In addition, when the selector 11 switches from an amplified first audio signal to an amplified second audio signal at the user's command, pop noise is generated due to a voltage level difference between the amplified audio signals.

Meanwhile, a one-to-one connection method has been used in order to prevent pop noise in an audio processing system. The one-to-one connection method involves removal of the selector 11 which serves as a switch operating at a user's command, separate amplification of each audio signal inputted through at least one input unit 10-1, or 10-2 or . . . by the amplifiers 12-1, 12-2, . . . , and output of each amplified audio signal to a digital terminal (not shown).

However, the one-to-one connection method is quite costly since the audio signals separately amplified by each amplifier 12-1, 12-2, . . . must be sent to a digital terminal through separate lines. Also, the one-to-one connection method requires that the user manually connect the digital terminals to the amplifiers 12-1, 12-2, . . . .

Figure 3:
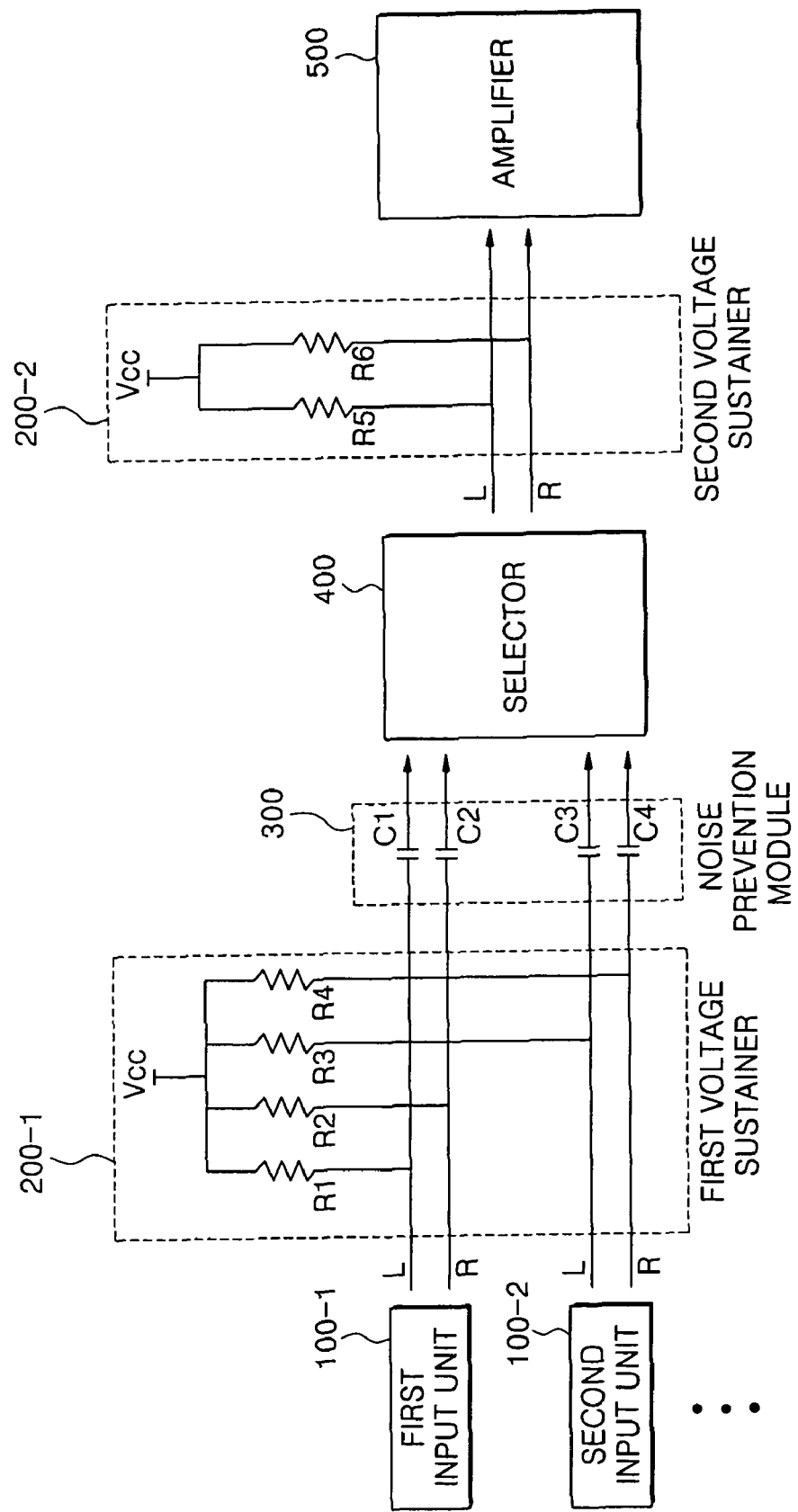
FIG. 3 is a schematic block diagram of an audio processing system according to the present invention.

FIG. 3 is a schematic block diagram of an audio processing system according to the present invention.

Referring to FIG. 3, the audio processing system according to the present invention comprises a plurality of input units 100-1, 100-2, . . . , a plurality of voltage sustainers 200-1 and 200-2, a noise prevention module 300, a selector 400, and an amplifier 500.

The input units 100-1, 100-2, . . . are connected to audio equipment (not shown) and output audio signals inputted from the audio equipment to the selector 400.

The selector 400 selects one of the audio signals received from the input units 100-1, 100-2, . . . at a user's command, and outputs the selected audio signal to the amplifier 500.

Each voltage sustainer 200-1 and 200-2 maintains the audio signal sent from each input unit 100-1, 100-2, . . . to the selector 400 at the same voltage as is outputted from selector 400. That is, in order to prevent noise due to a voltage level difference between the audio signals, each voltage sustainer 200-1 and 200-2 maintains equality between the voltage levels of the audio signals inputted to the selector 400 and the voltage level of the audio signal outputted from the selector 400.

The voltage sustainers 200-1 and 200-2 may be pull-up circuits made up of a plurality of resistors R1 to R6.

In addition, each voltage sustainer 200-1 and 200-2 applies predetermined voltages to the audio signals inputted to the selector 400 and the audio signal outputted from the selector 400 according to an applied voltage Vcc and the resistance of a corresponding resistor R1 to R6. Therefore, the voltage sustainers 200-1 and 200-2 prevent an abrupt change in voltage level between the input ports and output port of the selector 400.

A first voltage sustainer 200-1 is disposed between the input units 100-1, 100-2, . . . and the selector 400, and the resistors R1 to R4 are connected at one end to signal lines connecting the input units 100-1, 100-2, . . . and the selector 400, and at the other end to a voltage source Vcc.

In addition, a second voltage sustainer 200-2 is disposed between the selector 400 and the amplifier 500, one end of the resistors R5 and R6 being connected to signal lines connecting the selector 400 and the amplifier 500, and the other end of the resistors R5 and R6 being connected to another voltage source Vcc.

In the latter regard, the voltage sources Vcc of the first voltage sustainer 200-1 and the second voltage sustainer 200-2 have the same voltage value.

The noise prevention module 300 is made up of a plurality of capacitors C1 to C4, and when the selector 400 switches from a first audio signal received from the first input unit 100-1 to a second audio signal received from the second input unit 100-2 at the user's command, the noise prevention module 300 causes an otherwise abrupt voltage level change to occur gradually.

In other words, when the user selects another audio signal, the noise prevention module 300 prevents the voltage level of the audio signal output from the selector 400 from abruptly changing.

The noise prevention module 300 utilizes the characteristics of the capacitors C1 to C4. One end of the capacitors C1 to C4 is connected to the input units 100-1, 100-2, . . . , and the other end is connected to the selector 400.

Figure 4:
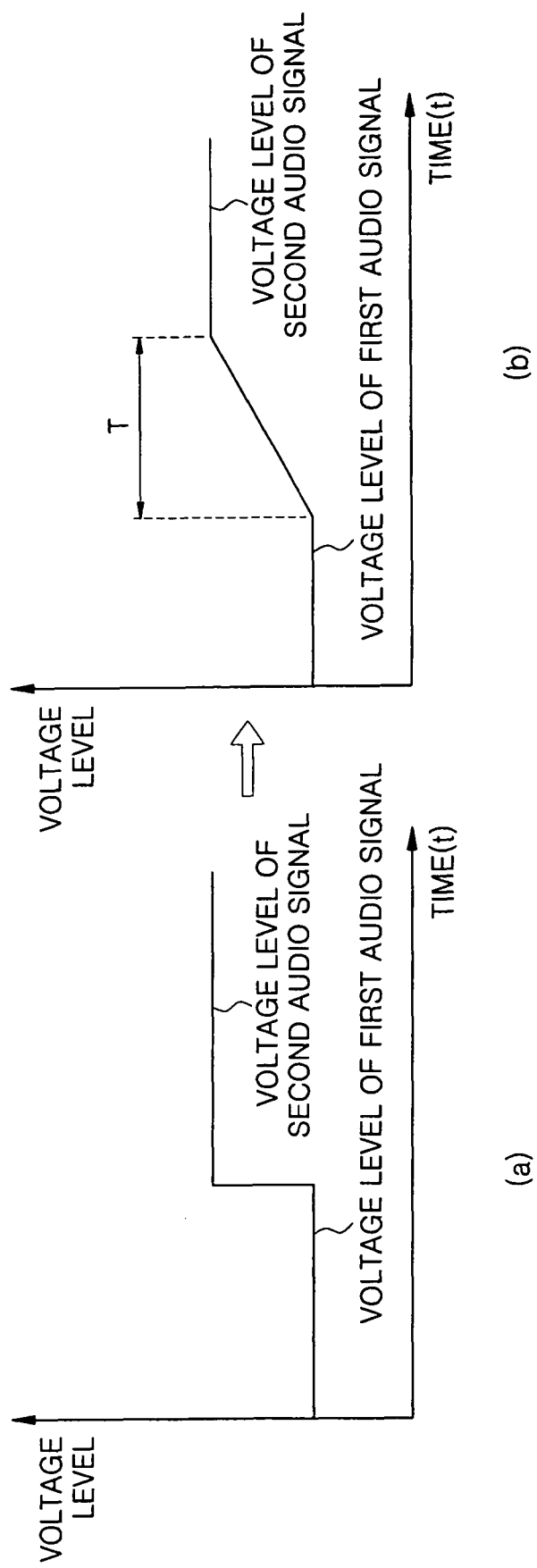
FIG. 4 is a pair of graphs illustrating voltage level change of audio signals according to the present invention.

FIG. 4 is a pair of graphs illustrating voltage level change of audio signals according to the present invention.

In FIG. 4, time is plotted on the horizontal axes and voltage is plotted on the vertical axes.

Graph (a) illustrates voltage level change when a second audio signal is selected while a first audio signal is being outputted in a general audio processing system. It can be seen that the voltage level abruptly changes.

Graph (b) illustrates voltage level change when the second audio signal is selected while the first audio signal is being outputted in the audio processing system according to the present invention. It can be seen that the voltage level gradually changes during a time T.

The capacitors C3 and C4 of the noise prevention module 300 act as a buffer preventing abrupt change in voltage when the audio signal output by the selector 400 changes.

The time T during which the voltage level gradually changes according to the selection of the selector 400 can be adjusted by adjusting the capacitance of each capacitor C1 to C4.

For example, when the capacitances of the capacitors C1 to C4 are 100 nF, the voltage source Vcc is 2.5 V, and when the resistances of the resistors R1 to R6 are 100 kΩ, pop noise can be ideally prevented.

Meanwhile, the amplifier 500 amplifies an audio signal received from the selector 400 by a predetermined ratio, and outputs the amplified audio signal to a digital terminal (not shown in the drawings).

As described above, when switching from a first audio signal to a second audio signal at a user's command, the audio processing system according to the present invention causes an otherwise abrupt voltage level change due to high-speed switching between the two audio signals to occur gradually using a pull-up circuit and a capacitor circuit, and thus prevents noise due to an abrupt voltage level change.

While the present invention has been described with reference to exemplary embodiments thereof, it will be understood by those skilled in the art that various changes in form and detail may be made therein without departing from the scope of the present invention as defined by the following claims.

What is claimed is:

1. An audio processing system, comprising:
   a selector to maintain a voltage level of a first audio signal among at least two audio signals at a value, to select a second audio signal in response to a selection, to gradually increase the voltage level of the first audio signal to a voltage level of the selected second audio signal among the at least two audio signals for a time, and to output the selected second audio signal;
   an amplifier to maintain the voltage level of the selected second audio signal received from the selector at a value, and to amplify the selected second audio signal by a ratio and
   a noise prevention module comprising a plurality of capacitors disposed at the input side of the selector, the capacitors configured to respectively receive the at least two audio signals at one end and being connected to the respective input lines of the selector at another end.

2. The audio processing system according to claim 1, wherein the system further comprises:
   a first voltage sustainer comprising a plurality of resistors and disposed at an input side of the selector, the resistors being connected to a first voltage source at one end and to respective input lines of the noise prevention module at another end.

3. The audio processing system according to claim 2, wherein the system further comprises:
   a second voltage sustainer comprising a plurality of resistors and disposed at an input side of the amplifier, the resistors being connected to a second voltage source at one end and to respective output lines of the selector at another end.

4. The audio processing system according to claim 3, wherein the first voltage source and the second voltage source have the same voltage value.

5. The audio processing system according to claim 3, wherein the resistors of the first voltage sustainer and the second voltage sustainer have the same resistance as each other.

6. The audio processing system according to claim 1, wherein the system further comprises:
   a second voltage sustainer comprising a plurality of resistors and disposed at an input side of the amplifier, the resistors being connected to a second voltage source at one end and to respective output lines of the selector at another end.

7. The audio processing system according to claim 6, wherein the resistors of the second voltage sustainer have the same resistance as each other.

8. The audio processing system according to claim 1, wherein the capacitors of the noise prevention module have the same capacitance as each other.

9. An audio processing system, comprising:
   at least two input units, each configured to output an audio signal;
   a selector to select one of the output audio signals in response to a selection of a user;
   an amplifier to amplify the selected one of the audio signals by a ratio; and
   a noise prevention module comprising a plurality of capacitors disposed between the at least two input units and the selector to gradually increase a voltage level of the selected one of the audio signals for a time, the capacitors being connected to an input port of the selector at one end and to respective output ports of the at least two input units at another end.

10. The audio processing system according to claim 9, further comprising:
    a second voltage sustainer comprising a plurality of resistors and disposed at an input side of the amplifier, the resistors being connected to a second voltage source at one end and to respective output lines of the selector at another end.

11. The audio processing system according to claim 10, wherein the resistors of the second voltage sustainer have the same resistance as each other.

12. The audio processing system according to claim 10, further comprising:
  a first voltage sustainer comprising of a plurality of resistors and disposed between the at least two input units and the noise prevention module, the resistors being connected to a first voltage source at one end and to respective capacitors of the noise prevention module at another end.

13. The audio processing system according to claim 12, wherein the first voltage source and the second voltage source have the same voltage value.

14. The audio processing system according to claim 13, wherein the resistors of the first voltage sustainer and the second voltage sustainer have the same resistance as each other.

15. The audio processing system according to claim 14, wherein the capacitors of the noise prevention module have the same capacitance as each other.

16. An audio processing method, comprising:
  providing a selector with at least one audio signal via a plurality of capacitors, respectively;
  outputting a first audio signal from the selector to an amplifier, the first audio signal having a first voltage level;
  receiving a selection of a second audio signal; and
  outputting the second audio signal from the selector to the amplifier in response to receipt of the selection of the second audio signal, the second audio signal having a second voltage level exceeding the first voltage level,
  wherein outputting the second audio signal comprises gradually increasing a voltage output from the selector from the first voltage level to the second voltage level, and
  wherein the plurality of capacitors prevent an abrupt change in voltage level when outputting the second audio signal in response to receiving the selection of the second audio signal.

17. The audio processing method according to claim 16, further comprising:
  ceasing the output from the selector of the first audio signal in response to receipt of the selection of the second audio signal; and
  amplifying the second audio signal.

* * * * *